Aug. 30, 1949.   R. S. DOLE   2,480,452
VOLT-AMPERE DEMAND LIMITER
Filed Aug. 22, 1945
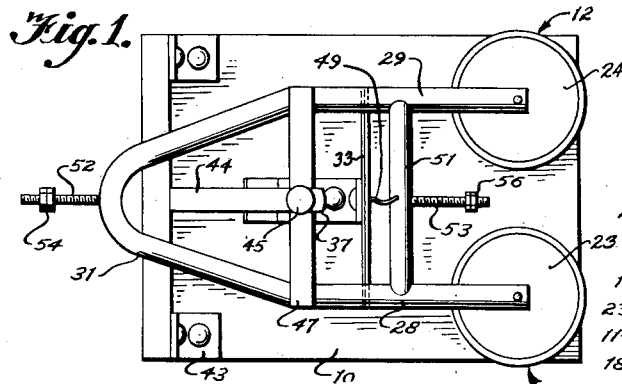
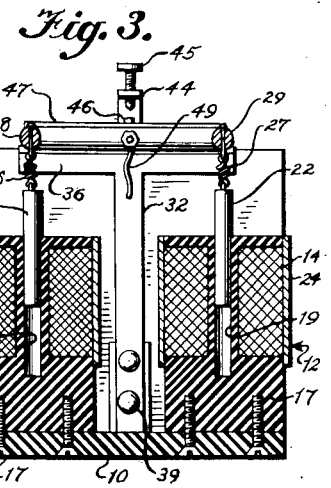
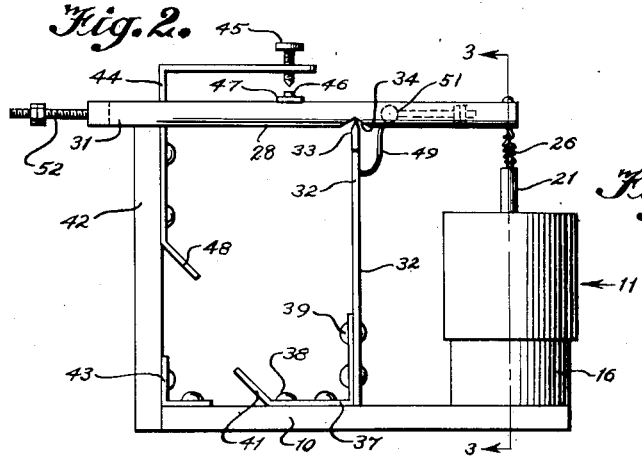
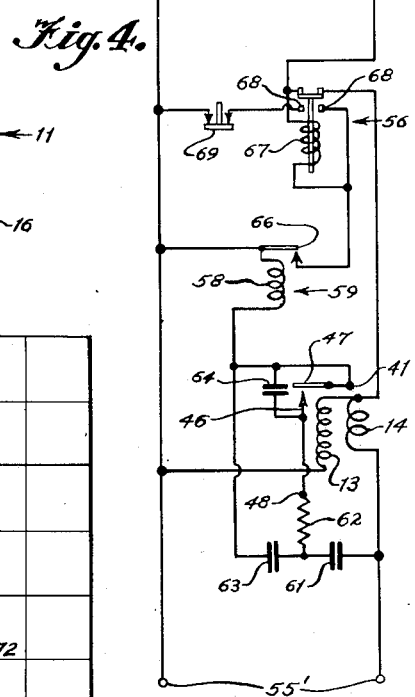
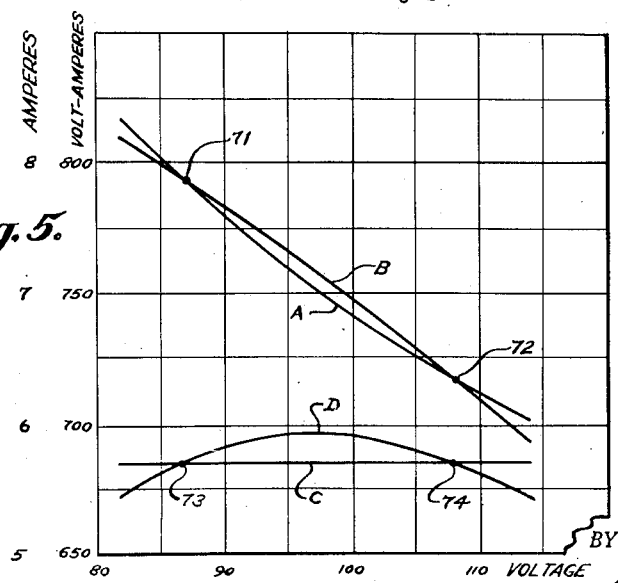
INVENTOR.
Robert S. Dole
BY Bacon & Thomas
ATTORNEYS Patented Aug. 30, 1949

2,480,452

UNITED STATES PATENT OFFICE 2,480,452

VOLT-AMPERE DEMAND LIMITER

Robert S. Dole, Lewiston, Idaho

Application August 22, 1945, Serial No. 612,038

8 Claims. (Cl. 171—97)

This invention relates to a volt-ampere demand limiter and more particularly to a device responsive to the current and voltage taken by a load and operating to disconnect the load or a part thereof when the volt-ampere demand of the load exceeds a predetermined amount.

The present invention has been developed as part of an improved system for distributing and selling electric power. Electric power is ordinarily sold on the basis of power used, for example, so much per kilowatt hour with either a fixed price per unit or a sliding scale in which the price per unit diminishes as the amount of power used increases. This method of selling power has many disadvantages particularly in rural or manufacturing areas. In such areas much of the power is employed for uneven and relatively heavy loads resulting in heavy peak loads requiring design of the system for such peak loads. For example, transmission lines as well as generating equipment must be much greater in capacity than would be the case if the load were more uniformly distributed. Also many of such loads will usually have relatively low power factor characteristics so that the system must be designed on a k. v. a. peak basis rather than on a power peak basis, the k. v. a. peak being much greater than the power peak. There is, however, no incentive for a customer to improve his power factor or load distribution when the service is billed on the basis of power used. Thus, the customer is not billed in a direct ratio to the most important of the power company's expenses.

The present invention has major utility in a system wherein the customer purchases a predetermined maximum k. v. a. demand at some predetermined price per month or year. This will allow unlimited use of electrical energy as long as the k. v. a. demand contracted for is not exceeded. Aside from making the price charged for power more nearly reflect the actual expenses of the power company, monthly meter readings are eliminated and users whose load develops a low power factor are automatically penalized. The load is more uniformally distributed over a twenty-four hour or longer period as the user of power will be forced to distribute his load so as to effectively use power without exceeding the k. v. a. demand for which he has contracted. It will, of course, be apparent that the invention has its major utility in systems in which the energy is primarily developed by water power so that the original investment and maintenance represent the major costs although it is entirely possible to arrange the schedule of rates so that they are applicable to systems in which the electrical energy is primarily developed by the employment of fuel. Because of the absence of major peaks, more power can be transmitted over a given transmission line in a given period and less standby equipment is required at the power station to take care of peaks.

The present invention is therefore concerned with a device or system which will enable the customer to employ unlimited power up to a predetermined volt-ampere demand and which will eliminate the expense incident to the employment of watt hour meters for the individual customers. The simplest arrangement is to substitute a volt-ampere demand limiter for a watt hour meter for each customer. Such demand meters may disconnect all or a portion of the customer's load when a predetermined volt-ampere load is reached and require manual resetting of the limiter before power can be again used by the customer. A desirable arrangement is to render it impossible for the customer to use a greater volt-ampere load than that for which he has contracted.

An object of the present invention therefore is to provide a simple volt-ampere demand limiter which may replace the watt hour meters usually installed for each customer.

Another object of the invention is to provide a system in which a volt-ampere demand limiter makes it impossible for a customer to employ a greater volt-ampere load than that for which he has contracted.

Another object of the invention is to provide a relay which operates when the volt-ampere demand of a load reaches a predetermined amount so as to disconnect the load from the power system.

A further object of the invention is to provide a simple device responsive to both voltage applied across the load and the current taken by the load and which operates when the volt-ampere demand very closely approximates a predetermined amount.

Other objects and advantages of the invention will appear in the following description of a preferred embodiment of the present invention shown in the attached drawings, of which Figure 1 is a plan view of a volt-ampere relay in accordance with the present invention;

Figure 2 is a side elevation of the device of Figure 1;

Figure 3 is a vertical section taken on the line 3—3 of Figure 2;

Figure 4 is a schematic diagram of a complete volt-ampere limiter employing the relay of Figures 1 to 3, and Figure 5 is a view showing operating curves of the relay of Figures 1 to 3.

The relay of Figures 1 to 3 may include a base member 10 preferably of insulating material upon which is secured a pair of solenoids indicated generally at 11 and 12. The solenoids 11 and 12 are in general similar except that one of the solenoids 11 is a voltage solenoid having a coil 13 wound with a relatively large number of turns of small wire and solenoid 12 is a current solenoid provided with a coil 14 wound with a relatively small number of turns of large wire. The solenoids 11 and 12 may include spools 16 and 17, respectively, of insulating material upon which the coils 13 and 14 are wound. The spools 16 and 17 are provided with axial bores 18 and 19 to receive and guide solenoid plungers 21 and 22. The plungers 21 and 22 are preferably made of a good quality magnetic iron and the solenoids 11 and 12 may be partially ironclad, for example, by winding strips of magnetic iron laminations 23 and 24, respectively, around the coils 13 and 14. The plungers 21 and 22 may be supported by coil springs 26 and 27, respectively, in turn supported from the two arms 28 and 29 of a generally U-shaped member 31 which is mounted upon and supported by a knife edge member 32. The member 32 may be provided at its upper end with spaced knife edges 33 engaging notches 34 in the arms of the U-shaped member 31, the knife edges forming part of a cross member 36 integral with the member 32. The knife edge member 32 may be secured to the base 10 in any suitable manner, for example, by the angle bracket 37 and rivets 38 and 39, the angle bracket 37 also forming one terminal 41 for the contacts of the relay.

The rear end of the U-shaped member 31 in its contact open position may rest upon the upper surface of a rear frame member 42 secured to the base member 10 by any suitable means such as the angle bracket 43. The frame member 42 may also have secured thereto a contact member 44 extending upwardly and forwardly to receive an adjustable contact screw 45 adapted to engage a contact 46 secured to a cross member 47 spanning the arms 28 and 29 of the U-shaped member 31. The contact member 44 may also provide a terminal 48 for the contact 46. It will be apparent that energization of the coils 13 and 14 will produce a downward force on the solenoid plungers 21 and 22. The mass of the movable structure of the relay including the U-shaped member 31 and the plungers 21 and 22 is distributed so that this structure tends to remain in the position shown in Fig. 1. When the downward force on the plungers 21 and 22 becomes sufficiently great, however, the U-shaped member 31 will be rocked in clockwise position in Figure 2 about the knife edges 33 to close the contacts 46 and 47 and complete a circuit between the terminals 41 and 48.

In order to prevent substantial current flow through the knife edges 33 and insure consistent operation of the relay, a flexible conductor 49 of high electrical conductivity may be connected between the knife edge supporting member 32 and a reinforcing cross member 51 extending between the arms 28 and 29 of the U-shaped member 31. In order to adjust the device and vary the amount of force necessary to close the contacts 46 and 47, the U-shaped member 31 may be provided with a pair of screw threaded studs 52 and 53 secured in the rear portion of the member 31 and in the cross member 51, respectively, the studs 52 and 53 being provided with weights 54 and 56, respectively, in the form of nuts screw threaded upon the respective studs.

The solenoids 11 and 12 are designed to produce pulls upon their plungers 21 and 22 which are substantially proportional respectively to the square of the voltage applied across the coil 13 and to the square of the current flowing through the coil 14. That is to say, the iron of the plungers as well as the iron of the laminations 23 and 24 is preferably operated upon substantially straight portions of the saturation curves of the iron employed. For example, the flux developed by the respective coils in their operating ranges may be sufficient to saturate the iron of the plungers 21 and 22 so that the iron of these plungers is operated above the knee of the curve. As for the laminations 23 and 24, the iron thereof may, for example, be operated substantially below the knee of the curve, although the solenoids may be otherwise designed so long as the iron of the plungers and laminations are operated upon substantially straight portions of the curve. It has been found that the partly ironclad structure of the solenoids by reason of the laminations 23 and 24 produces a much more uniform distribution of the flux throughout the path moved by the plungers than is the case when such laminations are omitted.

It is further found that the employment of small tension springs 26 and 27 between the plungers and the U-shaped member 31 to a large extent prevents vibration of the plungers due to A. C. energization of the solenoid coils from being transmitted to the contacts when the device is operated upon alternating current. It is impossible to eliminate plunger vibration completely because the pull which the magnetic field exerts passes through zero every half cycle. This vibration may, however, be reduced by selecting a spring whose modulus makes the natural frequency of the spring and plunger greater than the frequency of the alternating current. For example, for 60 cycle alternating current, a spring is selected such that the natural frequency of the spring and plunger is substantially above 60 cycles. The spring must not be too stiff, however, as the stiffer the spring the more direct is the coupling between the plungers and the contacts.

In the relay shown, no spring resisting movement of the U-shaped member 31 is employed as it is found that much more uniformity of operation can be accomplished when the pull on the plungers 21 and 22 is resisted by gravity operating upon the U-shaped member 31 than is the case when a spring return is employed. Variation of spring tension due to changes in temperature, aging of the spring, etc., are eliminated and a higher contact pressure between the contacts 46 and 47 is obtained.

Figure 4 is an example of a circuit in which the relay of Figures 1 and 3 can be employed as a volt-ampere demand limiter. This circuit may have a pair of terminals 55 for connection to a power line and a pair of terminals 55' for connection to a load. A main magnetic switch 56 may have a pair of contacts 57 in series with a terminal 55 and a terminal 55', the current coil 14 of the relay being in series with the contacts 57. The voltage coil 13 is shown as being effectively connected across the terminals 55 or the terminals 55' as the current coil 14 has low impedance. Closure of the contacts 46 and 47 of the relay establishes a circuit through the operating coil 58 of a sensitive relay 59 which controls the magnetic switch 56. This circuit may be traced from one side of the line through a condenser 61, resistor 62, contacts 46 and 47 and relay coil 58 to the other side of the line. The condenser 61, in series with the contacts 46 and 47, has been found to reduce transient conditions of high current which occur when the contacts 47 are opened or closed. A condenser 63 is also shown connected in parallel with the resistor 62 and contacts 47. By employing a condenser 63 of sufficient size to supply most of the current for operating the relay 59, the contacts 46 and 47 need control only a small fraction of the current necessary to operate the relay. The resistor 62 is employed to limit the current through the contacts 46 and 47. Another condenser 64 is preferably employed in parallel with the contacts 46 and 47 to absorb surges of current due to induction in the coil 58 when the contacts 46 and 47 open.

Upon closure of the contacts 46 and 47, the coil 58 of the relay 59 is sufficiently energized to cause closure of contacts 66 of relay 59. This completes the circuit through the operating coil 67 of the magnetic switch 56 to open contacts 57 and disconnect the load from the line. Operation of magnetic switch 56 closes contacts 68 thereof to establish a holding circuit through the operating coil 67 of the magnetic switch and push button 69 so as to retain the contacts 57 of the magnetic switch open until the push button 69 has been manually depressed. This prevents repeated opening and closing of the magnetic switch due to opening and closing of relay contacts 46 and 47 when the magnetic switch 56 opens and closes and also makes it necessary for the customer to manually reset the system before he can continue the use of electric power. It will be apparent that the customer must reduce the connected load below the predetermined volt-ampere demand before magnetic switch 56 will remain closed.

As discussed above, the pull of the voltage coil 13 on the plunger 21 is proportional to the square of the voltage applied to the load and pull on the plunger 22 is proportional to the square of the current flowing through the load. The total pull tending to close the contacts 46 and 47 is thus proportional to the sum of the square of the current and the square of the voltage, i. e., $F=K(V^2+I^2)$. This is, of course, the equation of a circle having its origin at the center and a radius equal to $$\sqrt{\frac{F}{K}}$$

For theoretically perfect operation, the force required to close the contacts should be proportional to the current times the voltage or $F=KIV$. This is the equation for an equilateral hyperbola having a curvature opposite to that of the curvature of the circle discussed just above. It is therefore impossible to make these two curves exactly coincide but by proper design these two curves can be made to very closely approximate each other through any required operating range such that the relay closes substantially at the predetermined voltage-ampere value.

As a specific example, a relay operable within the range of approximately 82 to 114 volts and between approximately 5.9 and 8.2 amperes, and closing at a volt-ampere value of approximately 685 was built. The curve A of Figure 5 shows the current plotted against the voltage which for theoretically perfect operation should cause contact closure. That is to say, curve A is a small proportion of an equilateral hyperbola of the formula $F=KIV$. Curve B of Figure 5 shows the current plotted against the voltage which is actually required to cause contact closure in a relay of the type illustrated. That is to say, curve B is a small portion of the circle of the formula $F=K(V^2+I^2)$. In the operating range of the relay, it is seen that these curves relatively closely approach each other and intersect at two points 71 and 72. In curve C shown in Figure 5, the volt-amperes for theoretically perfect operation of the relay is shown plotted against the voltage in a range from 82 volts to 114 volts, this curve being a straight line parallel to the voltage axis. Also, curve D represents the actual volt-amperes at which the relay closes plotted against the voltage and again the two curves are relatively close together and intersect at the two points 73 and 74 at which points actual operation corresponds to the operation theoretically required. Thus, the error at the two points of intersection 73 and 74 is zero percent. The percent error at the central portion of the curve and at the ends can easily be calculated and is found to be 1.24% at the center of the curves and 1.9% at the ends of the curves. The range of voltages covered by the curves of Figure 5 is much greater than would ordinarily be encountered in practice during operation of a volt-ampere limiter. With a smaller voltage range the error can be very much reduced but, even with the conditions assumed in Figure 5, the error would never be greater than 1.9%. This error is well within tolerances usually set up for commercial apparatus. The curve D was checked against an actual relay in accurate adjustment and found to represent the action of such relay within 0.45 volt-ampere.

The relay referred to was provided with a voltage coil 13 wound with 22,000 turns of No. 39 gauge soft-drawn copper magnet wire and a current coil 14 wound with 55 turns of No. 12 gauge soft-drawn copper magnet wire. Both coils were wound upon a spool having a diameter of approximately three-eights of an inch and a winding length of approximately one inch, the spools having a one-fourth inch axial bore therein for receiving the relay plungers. Each coil was wrapped with thin laminations of transformer iron to produce a cross-sectional area of iron of approximately 0.52 square inch. The plungers were made of solid soft iron in cylindrical form having a diameter of approximately three-sixteenths of an inch and a length of approximately one inch. The remainder of the moving parts of the relay were made of non-magnetic material and balanced so that the relay contacts closed at 685 volt-amperes at voltages of approximately 87 and 108 volts. It will be appreciated that the relay can be adjusted for operation over a narrower range of voltages so that the error above discussed can be made as small as desired.

It will thus be seen that I have provided a volt-ampere demand limiter including a simple relay which closes its contacts to cause the load to be disconnected from the line whenever the volt-amperes taken by the load reaches a predetermined amount. By proper current and voltage coils, the relay can be made to operate through substantially any desired range of voltages and currents so as to close at substantially any desired K. V. A. value, the relays specifically disclosed and closing at 685 volt-amperes being given merely for purposes of illustration. Such a relay and limiter system lends itself to an improved method of distributing and selling power wherein peak loads are largely eliminated. While the invention has been described particularly with reference to an alternating current system, it should be clear that the relay and system are entirely applicable to direct current power systems. The only change necessary in Figure 4 would be to short-circuit condenser 61. Of course, in a D. C. system, the condenser 63 would be desirably replaced by a resistor and also the coupling springs 26 and 27 of the relay would no longer be necessary.

While I have described the preferred embodiment of my invention, it is understood that the details thereof may be varied within the scope of the following claims:

I claim:

1. A volt-ampere demand limiter for an alternating current power system, comprising, a first set of terminals for connection to a power line, a second set of terminals for connection to a load, a relay having a current coil in series with one of the terminals of said first set and one of the terminals of said second set so as to be energized by current taken by said load, a voltage coil effectively connected across one of said sets of terminals so as to be energized by the voltage applied across said load, and independent magnetic circuits for said coils, said relay also having a movable assembly urged in the same direction of movement by flux resulting from current flow in said coils and means yieldably resisting movement of said assembly, whereby said relay is operated to move said assembly when the volt-ampere demand of said load increases to approximately a predetermined value, and means responsive to operation of said relay for disconnecting said load from said line.

2. In a volt-ampere demand limiter for an alternating current power system, a relay connected between a power source and a load and having a voltage coil for connection across said load and a current coil for connection in series with said load, a separate magnetic circuit for each of said coils including a magnetic plunger slidably received in each of said coils so as to be urged into said coils by magnetic fields developed therein, a movable member mechanically connected to the plungers, said movable member being urged in the same direction of movement by both of said plungers to be moved thereby when the volt-ampere demand of said load reaches substantially a predetermined value, and means actuated by movement of said member for disconnecting at least a portion of said load from said source.

3. In a volt-ampere demand limiter for an alternating current power system, a relay having a current coil for connection in series between a load and a power source, a voltage coil for connection across said load, a separate magnetic circuit for each of said coils, one including a magnetic plunger slidably received within said current coil and positioned to be urged into said current coil by magnetic force and the other including a magnetic plunger slidably received in said voltage coil and positioned to be urged into said voltage coil by magnetic force, a movable member, a resilient connection between said each of said magnetic plungers and said movable member, said plungers urging said movable member in the same direction of movement through said resilient connections when the magnetic force on said plungers tends to move said plungers into said coils, said movable member having means providing a restoring force resisting movement of said movable member, and means controlled by movement of said movable member when said magnetic force overcomes said restoring force for disconnecting said load from said source.

4. In a relay structure, a first coil having a substantially vertical axis, a second coil having a substantially vertical axis, a horizontally extending U-shaped member having one of its ends positioned above each of said coils, a magnetic plunger suspended from each end of said member and slidably received in one of said coils, a knife edge member having a laterally extending knife edge supporting said member intermediate the ends thereof for rocking movement of said member about said knife edges, said member having its mass distributed to resist rocking movement of the member due to magnetic pull upon said plungers, and contacts actuated by movement of said member when said magnetic pull becomes sufficiently great to move said member.

5. In a relay structure, a first coil having a substantially vertical axis, a second coil having a substantially vertical axis, a horizontally extending U-shaped member having one of its ends positioned above each of said coils, a magnetic plunger suspended from each end of said member and slidably received in one of said coils, a knife edge member having a laterally extending knife edge supporting said member intermediate the ends thereof for rocking movement of said member about said knife edges, said member having its mass distributed to resist rocking movement of the member due to magnetic pull upon said plungers, and contacts actuated by movement of said member when said magnetic pull becomes sufficiently great to move said member, said magnetic plungers being suspended from the ends of said U-shaped member by resilient means to retard the transmission of vibration of said plungers to said movable members when said relay is energized by alternating current.

6. In a relay structure, a first coil having a substantially vertical axis, a second coil having a substantially vertical axis, a horizontally extending U-shaped member having one of its ends positioned above each of said coils, a magnetic plunger suspended from each end of said member and slidably received in one of said coils, a knife edge member having a laterally extending knife edge supporting said member intermediate the ends thereof for rocking movement of said member about said knife edges, said member having its mass distributed to resist rocking movement of the member due to magnetic pull upon said plungers, and contacts actuated by movement of said member when said magnetic pull becomes sufficiently great to move said member, said magnetic plungers being suspended from the ends of said U-shaped member by resilient means to retard the transmission of vibration of said plungers to said movable members when said relay is energized by alternating current, said resilient means and said plungers forming mechanically resonant systems having a natural frequency substantially higher than the frequency of said alternating current.

7. In a volt-ampere demand limiter for an alternating current power system providing a source of alternating current power and a load connected to said source, a relay having a current coil effectively connected in series with said load, a voltage coil effectively connected across said load, a separate magnetic circuit for each of said coils for magnetic flux resulting from current flow in said coils, a movable assembly, a support for said assembly providing for movement of said assembly relative to said support, said assembly having a portion urged by the flux of one of said coils to move said assembly in one direction relative to said support, a portion urged by the flux of the other of said coils to move said assembly in the same direction relative to said support, and a contact actuated by said movement of said assembly, means yieldably resisting movement of said assembly in said direction, whereby said assembly is moved to actuate said contact when the volt-ampere demand of said load increases to a predetermined value, and means controlled by said actuation of said contact to disconnect at least a portion of said load from said source.

8. In a volt-ampere demand limiter for an alternating current power system providing a source of alternating current power and a load connected to said source, a relay having a current coil effectively connected in series with said load, a voltage coil effectively connected across said load, a separate magnetic circuit for each of said coils for magnetic flux resulting from current flow in said coils, a movable assembly, a pivotal support for said assembly, said assembly having a portion urged in one direction about said pivotal support by the flux of one of said coils, another portion urged in the same direction about said pivotal support by the flux of the other of said coils and a contact actuated by pivotal movement of said assembly, means yieldably resisting movement of said assembly in said direction whereby said assembly is pivotally moved to actuate said contact when the volt-ampere demand of said load increases to a predetermined value, and means controlled by said actuation of said contact to disconnect at least a portion of said load from said source.

ROBERT S. DOLE.

REFERENCES CITED

The following references are of record in the file of this patent:

UNITED STATES PATENTS

| Number | Name | Date |
| --- | --- | --- |
| 719,917 | Warwick et al. | Feb. 3, 1903 |
| 796,646 | Hewlett | Aug. 8, 1905 |
| 885,143 | Conrad | Apr. 21, 1908 |
| 1,099,562 | Mertens | June 9, 1914 |
| 1,147,688 | Schairer | July 20, 1915 |
| 1,158,037 | Evans | Oct. 26, 1915 |
| 1,296,314 | Peterson | Mar. 4, 1919 |
| 1,700,240 | Scheril | Jan. 29, 1929 |
| 1,894,119 | Pratt | Jan. 10, 1933 |
| 1,894,838 | Weaver | Jan. 17, 1933 |
| 1,988,278 | Kaufman | Jan. 15, 1935 |
| 2,011,396 | Cogswell | Aug. 13, 1935 |
| 2,061,347 | Coe | Nov. 17, 1936 |